UNITED STATES PATENT OFFICE 2,616,787

FREE-FLOWING AMMONIUM NITRATE AND METHOD FOR THE PRODUCTION OF SAME

John Whetstone, West Kilbride, Scotland, assignor to Imperial Chemical Industries Limited, a corporation of Great Britain No Drawing. Application March 23, 1950, Serial No. 151,519. In Great Britain January 6, 1947

19 Claims. (Cl. 23—103)

The present invention is concerned with providing ammonium nitrate in a free-flowing form in which the tendency towards caking or setting is very much reduced.

As is well known, ammonium nitrate is a very hygroscopic substance and readily absorbs water or moisture and, for this reason, ammonium nitrate in storage demonstrates a marked and undesirable tendency to cake or set.

It has now been found that certain sulphonated aromatic dyestuffs, namely, those which are soluble to the extent of at least 0.05% in a saturated aqueous ammonium nitrate solution at 20° C., when distributed externally, preferably in proportion of not less than about 0.10%, over the surfaces of ammonium nitrate in crystalline form or that produced by a spray crystallization process, improve the resistance to caking shown by the ammonium nitrate.

In this connection, it has been found that these sulphonated aromatic dyestuffs exercise an effect on the crystal habit of the form of ammonium nitrate which is normally stable at —18° C. to +32° C., known as ammonium nitrate IV, and which normally crystallizes from aqueous solutions in the form of (110) prisms or needles. It has also been found that the effect of a given dyestuff on the setting of ammonium nitrate is linked with the magnitude of the crystal habit modification brought about on the ammonium nitrate by a saturated solution of the dyestuff in the saturated ammonium nitrate solution (mother liquor). The solubility of the dyestuff in saturated ammonium nitrate solution at ordinary temperatures is, accordingly, an important factor in affecting the magnitude of the crystal habit modification but the number and, in some cases, the orientation of the sulphonic acid substituent groups in the aromatic nucleus of the dyestuff are also important.

As the setting of ammonium nitrate appears to be essentially a result of recrystallization of the ammonium nitrate from the saturated solution present on the surfaces of the material that has been exposed to the atmosphere, the effect of the sulphonated aromatic dyestuff on the crystal habit of ammonium nitrate IV crystallizing from aqueous solution in the case where the dyestuff has sufficient solubility is reflected in its effect on the setting of a mass of free particles of ammonium nitrate on storage. The anti-setting effect depends also on the magnitude of the effect exerted on the crystal habit by the particular dyestuff employed. In general, the presence of a sulphonated aromatic dyestuff of the type described in the crystallizing solution that results in the crystallization of the ammonium nitrate in the form of minute scales or fragile plates effects a considerable reduction in setting, but those of the aforesaid dyestuffs that permit the formation of better defined crystal forms are less effective in preventing the setting of ammonium nitrate. The general effect of these sulphonated aromatic dyestuffs on the crystal habit of ammonium nitrate IV is to induce the formation of (010) prisms, laths, plates or scales instead of the usual (110) elongated prisms or needles.

Accordingly, the present invention is concerned with the provision of a modified ammonium nitrate consisting of a mixture of 100 parts of ammonium nitrate and 0.01 to 1.0 part of at least one sulphonated aromatic dyestuff which is soluble to the extent of at least 0.05% in a saturated aqueous ammonium nitrate solution at 20° C.

By the phrase "sulphonated aromatic dyestuff" it is meant to include aromatic dyestuffs containing at least one sulphonic acid group and salts thereof.

Typical sulphonated aromatic dyestuffs which have been found to be especially effective are, for example, the monoazo dyestuff Amaranth (Color Index No. 184) which is the sodium salt of 4-sulpho-α-naphthalene-azo-β-naphthol-3 - 6 - disulphonic acid, the acid triphenylmethane dyestuffs Disulphine Blue V (Color Index No. 712) which is the sodium salt of the disulphonic acid of m' hydroxy tetra ethyl diamino triphenyl carbinol anhydride and the ammonium salt of disulphonated methyl violet which is a disulphonate of tetra, penta or hexamethyl pararosaniline. The mixture of the sodium or ammonium salts of the di- and tri-sulphonic acids of pararosaniline and rosaniline, commercially known as the dyestuff Acid Magenta (Color Index No. 692) has also been found to effect a marked lessening of the tendency of the salt to set due to modification of the crystal habit of ammonium nitrate, particularly advantageous results being obtained when the quantity of Acid Magenta is from 0.05 to 0.1 part per 100 parts of ammonium nitrate.

In addition to the above, many other sulphonated aromatic dyestuffs of various classes which fall within the definition prescribed above have been found effective in the habit modification of ammonium nitrate IV, though in certain cases the effect on habit may only be sporadic depending on the conditions during crystallization, and may be employed for the purpose of the present invention.

The modified ammonium nitrate of the present invention can be formed by effecting crystallization from aqueous solutions of ammonium nitrate containing the dyestuff. This can be accomplished by direct crystallization through slow cooling or evaporation, by granulation in, for example, a graining kettle or incorporator or by spray crystallization.

It has also been observed that the addition of, for instance, 0.5 to 1.0 part of the said dyestuffs to 100 parts of spray crystallized ammonium nitrate lessens the tendency toward caking or setting. Furthermore if it is required to treat ammonium nitrate during explosive manufacture with a small quantity of water after the usual drying, it has also been found very desirable for this water to include at least one of the described dyestuffs in solution.

The following examples, in which the parts are by weight, are illustrative of the various procedures by which the modified ammonium nitrate of the present invention may be obtained.

*Example I*

By the following procedure finely divided ammonium nitrate can be produced by direct crystallization in a form which is free-flowing when dried and suitable for direct incorporation in explosive compositions.

A saturated solution of ammonium nitrate at 80° C., containing 0.10 part of Acid Magenta per 100 parts ammonium nitrate, is allowed to cool, with stirring, to room temperature. The crystalline deposit is very finely divided, and the mother liquor is drained away in a centrifugal machine, or the crystals are filtered in vacuo. The crystals are dried by heating in air at 100° C., and separated by passing through a sieve when dry.

The material passing through the sieve is of a free-flowing nature and does not tend to cohere on prolonged storage in a closed container but remains free-flowing. Likewise, if the material is permitted to absorb appreciable quantities of moisture up to 1 or 2%, and is subsequently dried, it is found that the material will remain quite soft. These characteristics render the ammonium nitrate prepared in this manner exceptionally suitable for use in explosives in comparison with untreated material of similar fineness.

The fineness of subdivision of the magenta dyed ammonium nitrate may be due to (a) the modification of the crystal habit of the ammonium nitrate permitting the formation of soft crystals of thin section, readily breaking into fragments due to stirring during the crystallization, (b) a generally observed reduction in the size of the crystals produced in the presence of small proportions of Acid Magenta.

A sieve analysis of ammonium nitrate crystallized in the above manner contrasted with ammonium nitrate ground up in an edge runner mill, is given below:

| Directly crystallized from Acid Magenta Solution | Edge Runner Milled Ammonium Nitrate |
|---|---|
| Thro' 60 B. S. S.—88% | Thro' 60 B. S. S.—92%; 85 B. S. S.—71%. |
| Thro' 100 B. S. S.—85% | Thro' 100 B. S. S.—64%; 150 B. S. S.—56%. |
| Thro' 170 B. S. S.—77% | Thro' 170 B. S. S.—48%; 200 B. S. S.—45%; 300 B. S. S.—36%. |

*Example II*

Ammonium nitrate can be produced in a form which is free-flowing and resistant to setting by adding 0.05 part of Acid Magenta for every 100 parts of ammonium nitrate in an ammonium nitrate solution which is to undergo granulation in a graining kettle, or incorporator, or similar apparatus. The ammonium nitrate which is formed when 500 parts of ammonium nitrate containing 15 parts of water and 0.25 part of Acid Magenta is allowed to crystallize in a Werner-Pfleiderer incorporator from a temperature of 120°–130° C. tends to be less finely divided than that prepared according to Example I. The water added, however, evaporates in the course of the preparation presumably because of the heat of crystallization and the heat resulting from the change in crystalline form of the ammonium nitrate on cooling. Thus a free-flowing product is produced directly in one operation. The fineness of the ammonium nitrate produced is capable of control by the agitation provided in the graining kettle or incorporator or the like apparatus.

A sieve test of ammonium nitrate prepared as above in a Werner-Pfleiderer incorporator gave the following results:

94 per cent passed through a 60 B. S. S. sieve
50 per cent passed through a 100 B. B. S. sieve
18 per cent passed through a 150 B. B. S. sieve
7 per cent passed through a 200 B. B. S. sieve
4 per cent passed through a 300 B. S. S. sieve

*Example III*

Finely divided ammonium nitrate can be produced by crystallization in a form which when dried is free-flowing and is suitable for direct incorporation in explosive compositions, by the use of the ammonium salt of disulphonated Methyl Violet.

Methyl Violet (Color Index No. 680) is an example of a cationic triphenylmethane dyestuff which is only negligibly soluble in saturated ammonium nitrate solutions and is without effect on the crystal habit of ammonium nitrate. It is not effective for the purpose of the present invention. On the other hand, when Methyl Violet is disulphonated and isolated as the ammonium salt the resulting ammonium salt is much more soluble in saturated ammonium nitrate solution than the parent Methyl Violet and has an anti-setting effect. Ammonium nitrate IV when directly crystallized by slowly cooling or evaporating at a temperature below 32° C. from a solution containing 0.4% of the ammonium salt of di-sulphonated Methyl Violet crystallizes in flat laths with (010) faces well developed.

Ammonium nitrate may be produced in a form which is resistant to setting and which is free-flowing by the inclusion of at least 0.1 part of the ammonium salt of disulphonated Methyl Violet for every 100 parts of ammonium nitrate in a saturated ammonium nitrate solution which is to undergo granulation at 100 to 130° C. in an incorporator, graining kettle or similar apparatus. The water present evaporates during the process owing to the heat of crystallization and heat of transition of the ammonium nitrate on cooling. The product is of a lavender color, and is free-flowing and does not become hard after successively allowing it to absorb 1.0% moisture and drying it at 20° C.

*Example IV*

100 parts ammonium nitrate granules produced by a spray crystallization process of particle size 30 to 100 B. S. S. are heated to 100° C. in a suitable mixer and 0.8 part hot water and 0.10 part of the ammonium salt of disulphonated Methyl Violet are added. The ammonium salt of disulphonated Methyl Violet dissolves in the hot ammonium nitrate solution produced and is distributed over the surface of the granules as the water evaporates. The dry product preserves the original form of the granules, which, however, are rendered more lastingly free running and resistant to setting.

*Example V*

100 parts of ammonium nitrate dissolved in 5 parts of water at 120–130° C. in a graining kettle or incorporator are heated with 0.1 part of the dyestuff Disulphine Blue V (Color Index No. 712). On evaporation of the water during the cooling process a deep blue colored powder is obtained, which does not tend to cohere rapidly on storage in a closed container, and which shows a greater resistance to caking than untreated ammonium nitrate, when tested by bringing about moderate moisture absorption and subsequently drying.

*Example VI*

The procedure is the same as for Example V except that Amaranth (Color Index No. 184) is used instead of dyestuff Disulphine Blue V. Aggregates of thin scales and flat plates showing (010) faces are obtained on slow cooling of the saturated solution of the dyestuff in saturated ammonium nitrate solution, and on treatment of ammonium nitrate with 0.1% of Amaranth as described for Disulphine Blue V a free-flowing product with only little tendency to cohere on keeping is obtained.

This application is a continuation-in-part of my copending applications, Serial No. 786,785, filed November 18, 1947, now abandoned, and Serial No. 40,439, filed July 23, 1948, now abandoned.

Having thus described my invention what I claim as new is:

1. A free flowing ammonium nitrate comprising crystals of ammonium nitrate containing per 100 parts of ammonium nitrate, from .01 to 1.0 part of at least one sulphonated aromatic dyestuff predominantly distributed on the surface of said crystals which is soluble to the extent of at least .05% in a saturated aqueous ammonium nitrate solution at 20° C. and which in solution in a saturated aqueous solution of ammonium nitrate at 20° C., conditions said solution to produce on crystallization in the temperature range in which the stable form of ammonium nitrate is ammonium nitrate IV, crystals of ammonium nitrate IV as [010] prisms, laths, plates or scales.

2. A free flowing ammonium nitrate as recited in claim 1 wherein the sulphonated aromatic dyestuff is the sodium salt of 4-sulpho-α-naphthalene-azo-β-naphthol-3-6-disulphonic acid.

3. A free flowing ammonium nitrate as recited in claim 1 wherein the sulphonated aromatic dyestuff is the sodium salt of the disulphonic acid of m' hydroxy tetra ethyl diamino triphenyl carbinol anhydride.

4. A free flowing ammonium nitrate as recited in claim 1 wherein the sulphonated aromatic dyestuff is the sodium salt of the ammonium salt of a disulphonate of a para-rosaniline selected from the group consisting of tetra, penta and hexa-methyl para-rosaniline.

5. A free flowing ammonium nitrate as recited in claim 1 wherein the sulphonated aromatic dyestuff comprises a mixture of salts of di- and tri-sulphonic acids of para-rosaniline and rosaniline, said salts being selected from the group consisting of sodium and ammonium salts of the said sulphonated compounds.

6. A free flowing ammonium nitrate as recited in claim 5 wherein the quantity of the said sulphonated dyestuff is from .01 to .05 part per 100 parts of ammonium nitrate.

7. Modified ammonium nitrate consisting of a mixture of 100 parts of ammonium nitrate and 0.01 to 1.0 part of the sodium salt of 4-sulpho-α-naphthalene-azo-β-naphthol-3-6-disulphonic acid.

8. Modified ammonium nitrate consisting of a mixture of 100 parts of ammonium nitrate and 0.01 to 1.0 part of the sodium salt of the disulphonic acid of m' hydroxy tetra ethyl diamino triphenyl carbinol anhydride.

9. Modified ammonium nitrate consisting of a mixture of 100 parts of ammonium nitrate and 0.01 to 1.0 part of the ammonium salt of a disulphonate of a para-rosaniline selected from the group consisting of tetra, penta and hexamethyl para-rosaniline.

10. A method for the production of free flowing ammonium nitrate which comprises effecting crystallization of an aqueous solution of ammonium nitrate containing from 0.1 to 1.0 part per 100 parts of ammonium nitrate in solution of at least one sulphonated aromatic dyestuff which is soluble to the extent of at least .05% in a saturated aqueous ammonium nitrate solution at 20° C., and which in solution in a saturated aqueous solution of ammonium nitrate, conditions said solution to produce on crystallization in the temperature range in which the stable form of ammonium nitrate is ammonium nitrate IV, crystals of ammonium nitrate IV as [010] prisms, laths, plates or scales.

11. A method for the production of free flowing ammonium nitrate as recited in claim 10 which comprises effecting the direct crystallization of the aqueous solution of ammonium nitrate containing the said sulphonated aromatic dyestuff.

12. A method for the production of free flowing ammonium nitrate as recited in claim 10 which comprises effecting the granulation of an aqueous solution of ammonium nitrate containing the said sulphonated aromatic dyestuff.

13. A method for the production of free flowing ammonium nitrate as recited in claim 10 in which the aqueous solution of ammonium nitrate containing the said sulphonated aromatic dyestuff is crystallized by spraying.

14. A method for the production of free flowing ammonium nitrate as recited in claim 13 in which the said sulphonated aromatic dyestuff is added in from .05–0.1 per 100 parts of ammonium nitrate in the solution.

15. A method for the production of modified ammonium nitrate consisting of a mixture of 100 parts of ammonium nitrate and 0.01 to 1.0 part of the sulphonated dyestuff comprising a mixture of salts of the di- and tri-sulphonic acids of para-rosaniline and rosaniline, said salts being selected from the sodium and ammonium salts of said sulphonated compounds, which comprises effecting crystallization of an aqueous solution of ammonium nitrate containing the sulphonated dyestuff dissolved therein.

16. A method for the production of modified ammonium nitrate consisting of a mixture of 100 parts of ammonium nitrate and .01 to 1.0 part of the sodium salt of 4-sulpho-α-naphthalene-azo-β-naphthol-3-6-disulphonic acid which comprises effecting crystallization of an aqueous solution of ammonium nitrate containing said salt dissolved therein.

17. A method for the production of modified ammonium nitrate consisting of a mixture of 100 parts of ammonium nitrate and .01 to 1.0 part of the sodium salt of the disulphonic acid of m' hydroxy tetra ethyl diamino tri-phenyl carbinol anhydride which comprises effecting crystallization of an aqueous solution of ammonium nitrate containing said salt dissolved therein.

18. A method for the production of modified ammonium nitrate consisting of a mixture of 100 parts of ammonium nitrate and .01 to 1.0 part of the ammonium salt of a di-sulphonate of a para-rosaniline selected from the group consisting of tetra, penta and hexa-methyl para-rosaniline which comprises effecting crystallization of an aqueous solution of ammonium nitrate containing said salt dissolved therein.

19. A method for the production of free flowing ammonium nitrate which comprises treating crystals of ammonium nitrate after drying with a small quantity of water containing from .01 to 1.0 part per 100 parts of ammonium nitrate crystals being treated of at least one sulphonated aromatic dyestuff which is soluble to the extent of at least .05% in a saturated aqueous ammonium nitrate solution at 20° C., and which, in solution in a saturated aqueous solution of ammonium nitrate conditions said solution to produce on crystallization in the temperature range in which the stable form of ammonium nitrate is ammonium nitrate IV, crystals of ammonium nitrate IV as [010] prisms, laths, plates or scales.

JOHN WHETSTONE.

REFERENCES CITED

The following references are of record in the file of this patent:

UNITED STATES PATENTS

| Number | Name | Date |
|---|---|---|
| 1,056,365 | Raschig | Mar. 18, 1913 |
| 1,550,064 | Ehrlich | Aug. 18, 1925 |
| 2,015,062 | Benjamin | Sept. 24, 1935 |
| 2,377,670 | Burdett et al. | June 5, 1945 |
| 2,383,763 | Block et al. | Aug. 28, 1945 |
| 2,448,605 | Kleinicke | Sept. 7, 1948 |

OTHER REFERENCES

"Color Index," 1st ed. 1924, Society of Dyers and Colourists, pages 39, 42 and pages 6 and 7 of first supplement 1928.